United States Patent
Tsutazawa et al.

(10) Patent No.: US 7,224,973 B2
(45) Date of Patent: May 29, 2007

(54) COMMUNICATION AGENT APPARATUS (75) Inventors: Natsuko Tsutazawa, Tokyo (JP);
Naoko Ito, Tokyo (JP); Masafumi Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 75 days.

(21) Appl. No.: 11/083,959

(22) Filed: Mar. 21, 2005

(65) Prior Publication Data
US 2005/0215256 A1 Sep. 29, 2005

(30) Foreign Application Priority Data
Mar. 26, 2004 (JP) ............................... 2004-090905

(51) Int. Cl.
*H04Q 7/20* (2006.01)
(52) U.S. Cl. ...................... 455/437; 455/436; 455/440; 455/438; 455/456.3; 379/265.01; 379/266.1
(58) Field of Classification Search ................................ 329/265.01–266.1, 309; 455/432, 436, 438, 455/440, 456.3
See application file for complete search history.

(56) References Cited

U.S. PATENT DOCUMENTS

2005/0047581 A1* 3/2005 Shaffer et al. ......... 379/265.11
2005/0195960 A1* 9/2005 Shaffer et al. ......... 379/265.02

FOREIGN PATENT DOCUMENTS

JP 2003-169137 6/2003

* cited by examiner

*Primary Examiner*—Joseph Feild
*Assistant Examiner*—David Q. Nguyen
(74) *Attorney, Agent, or Firm*—Foley & Lardner LLP (57) ABSTRACT

A communication agent apparatus includes at least one mobile unit, a presence information inquiring unit, a handling method determination unit, and a handling method execution unit. The mobile unit transports a communication device. The presence information inquiring unit acquires presence information indicating the current situation of a called user. The handling method determination unit determines a handling method for communication made from a calling user to the called user on the basis of the acquired presence information. The handling method execution unit executes the determined handling method. When the handling method determination unit determines a handling method of delivering a communication device used for communication to the called user, the mobile unit delivers the communication device to the called user in accordance with a move command from the handling method execution unit.

11 Claims, 6 Drawing Sheets

```
<presence entity="sip:callee@example.com">
<tuple id="7c6dqui">
 <status>
   <basic>open</basic>
   <myex:location>home</extension>
   <myex:detailed-location>garden</extension>
   <myex:telephone>possible</extension>
   <myex:codeless handset>un-carrying</extension>
 </status>
</tuple>
</presence >
```

COMMUNICATION AGENT APPARATUS

BACKGROUND OF THE INVENTION

The present invention relates to a communication agent apparatus which intermediates communication on the basis of presence information indicating the current situation of a called user.

A conventional communication system disclosed in Japanese Patent Laid-Open No. 2003-169137 (reference 1) comprises a service control station which has a communication function (call forwarding service to an agent communication device, a telephone answering service, or the like) designated by a called user in correspondence with presence information indicating the current situation of the called user, a communication device which allows a calling user to select a desired communication method of communication methods corresponding to the presence information, a communication control station which generates a command which can execute the selected communication method, and an information transfer apparatus which executes the selected communication method for communication between the calling communication device and the called communication device in accordance with the generated command.

The above communication system can provide a facility for a called user by serving as an agent for communication made to the called user on the basis of presence information indicating the current situation of the called user. However, the handling methods which a conventional apparatus of this type can take are mainly limited to the distribution of communication such as call forwarding service to an agent communication device and telephone answering service. For this reason, this system does not effectively function in a situation in which, for example, a called user wants to answer by himself/herself but cannot answer because he/she is present in a place distant from the communication device.

SUMMARY OF THE INVENTION

It is an object of the present invention to provide a communication agent apparatus which can support a called user having no communication device at hand.

In order to achieve the above object, according to the present invention, there is provided a communication agent apparatus comprising at least one mobile unit which transports a communication device, a presence information inquiring unit which acquires presence information indicating a current situation of a called user, a handling method determination unit which determines a handling method for communication made from a calling user to the called user on the basis of the acquired presence information, and a handling method execution unit which executes the determined handling method, wherein when the handling method determination unit determines a handling method of delivering a communication device used for communication to the called user, the mobile unit delivers the communication device to the called user in accordance with a move command from the handling method execution unit.

DESCRIPTION OF THE PREFERRED EMBODIMENTS

Figure 1:
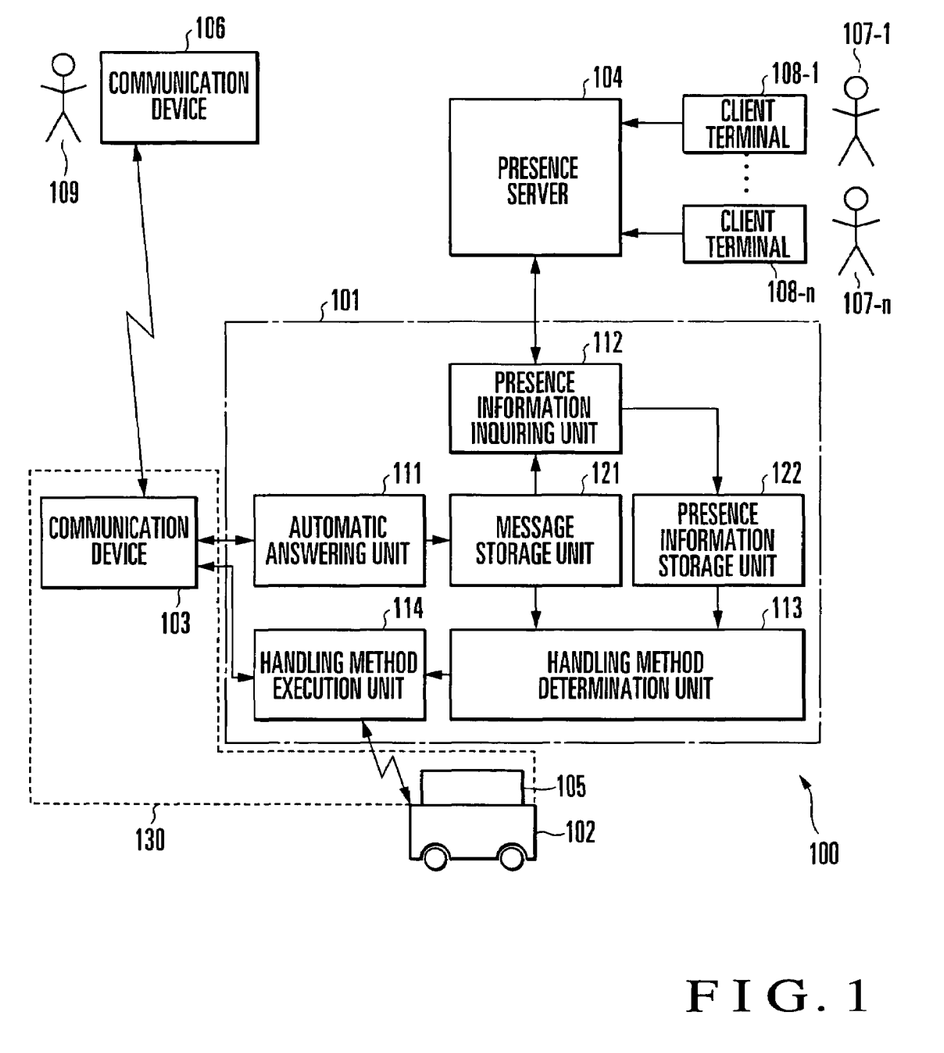
FIG. 1 is a block diagram of a communication agent apparatus according to the first embodiment of the present invention.

The arrangement of a communication agent apparatus according to the first embodiment of the present invention will be described below with reference to FIGS. 1 and 2. As shown in FIG. 1, a communication agent apparatus 100 comprises a main apparatus 101 and a miniature-size mobile unit 102 which can communicate with the main apparatus 101 by radio or the like. A communication device 103 and presence server 104 are connected to the main apparatus 101. A communication device 105 is detachably mounted in a communication device 105.

The communication devices 103 and 105 constitute a fixed telephone set 130. The communication device 103 serves as the base unit of the fixed telephone set 130, and the communication device 105 serves as a portable subsidiary unit of the fixed telephone set 130 which performs communication through the communication device 103. A communication device 106 is a telephone set used by a user 109 who serves as a calling user. FIG. 1 shows a state wherein communication is made from the communication device 106 to the communication device 103.

The presence server 104 provides the communication agent apparatus 100 with the current situations of users 107-1 to 107-n as called users which are input to client terminals 108-1 to 108-n. The basic architecture of the presence system is defined in RFC (Request For Comments) 2778. According to this, the presence system comprises a presentity which provides the presence information of a user, a watcher which observes the presence information, and a presence service which receives the presence information from the presentity and distributes it to the watcher. In association with this presence system, the client terminals 108-1 to 108-n, communication agent apparatus 100, and presence server 104 in FIG. 1 respectively correspond to the presentity, watcher, and presence service.

The mobile unit 102 comprises a moving vehicle which is self-propelled by driving wheels or belt conveyor using a battery or the like as a power source, a robot which can walk with two legs, or the like, and serves to deliver the detachably mounted communication device 105 to one of the called users 107-1 to 107-n.

The main apparatus 101 comprises an automatic answering unit 111 connected to the communication device 103, a presence information inquiring unit 112 connected to the presence server 104, a handling method determination unit 113 connected to the communication device 103, a handling method execution unit 114 connected to the handling method determination unit 113, a message storage unit 121 connected to the automatic answering unit 111, presence information inquiring unit 112, and handling method determination unit 113, and a presence information storage unit 122 connected to the presence information inquiring unit 112 and handling method determination unit 113.

The automatic answering unit 111 has a voice recognition function and voice synthesis function. The automatic answering unit 111 automatically answers when the communication device 103 receives an incoming call from the calling user 109. The automatic answering unit 111 also extracts information such as the name of one of the called users 107-1 to 107-n whom the calling user 109 wanted to call, the name of the calling user 109 himself/herself, and the like by performing voice recognition of a voice signal from the calling user. The extracted information is stored in the message storage unit 121.

The presence information inquiring unit 112 receives the name of one of the called users 107-1 to 107-n as a called target from the message storage unit 121, acquires presence information indicating the current situation of the called user from the presence server 104, and stores it in the presence information storage unit 122.

The handling method determination unit 113 refers to the current presence information of one of the called users 107-1 to 107-n as a called target from the presence information storage unit 122, and determines a handling method for communication made from the calling user 109 to one of the called users 107-1 to 107-n on the basis of the presence information. As a handling method, for example, a telephone answering service of recording a message or an agent answering service of making another user answer is conceivable. In this embodiment, a handling method of delivering the communication device 105 to one of the called users 107-1 to 107-n is supported.

The handling method execution unit 114 executes the handling method determined by the handling method determination unit 113. In the case of the telephone answering service of recording a message, a voice signal from the calling user 109 which is received through the communication device 103 is input and recorded on a recording device. In the case of the agent answering service of paging another user, paging is performed through a speaker (not shown) or paging a user who performs agent answering through an extension telephone, and the user is informed to answer a call as an agent. In the case of the handling method of delivering the communication device 105 to the called user, a move command is issued to the mobile unit 102 to deliver the communication device 105 to one of the called users 107-1 to 107-n.

Figure 2:
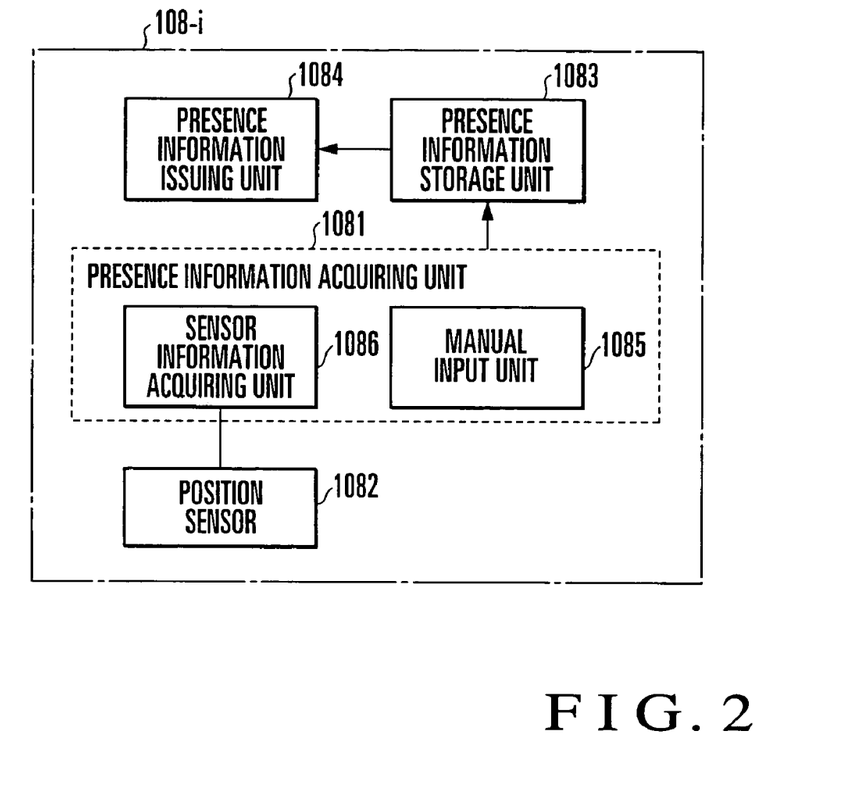
FIG. 2 is a block diagram of a client terminal in FIG. 1.

As shown in FIG. 2, the client terminal 108-i (i is 1 to n) comprises a presence information acquiring unit 1081, a position sensor 1082 connected to the presence information acquiring unit 1081, a presence information storage unit 1083 connected to the presence information acquiring unit 1081, and a presence information issuing unit 1084 connected to the presence information storage unit 1083. The presence information acquiring unit 1081 comprises a manual input unit 1085 and sensor information acquiring unit 1086.

The manual input unit 1085 comprises a keyboard and the like and is used to input the current presence information of the user. Presence information includes "online" indicating a communicative state.

The position sensor 1082 acquires the current position information of the user corresponding to the client terminal 108-i. In this embodiment, the client terminal 108-i is assumed to be a portable terminal. The position sensor 1082 comprises, for example, a sensor such as a GPS (Global Positioning System). Note that the terminal may be provided with an information processing unit which maps the position information detected by the position sensor 1082 on a map and specifies the place where the user is present like the garden or bedroom of the home. The sensor information acquiring unit 1086 acquires position information from the position sensor 1082. The presence information acquiring unit 1081 is not limited to one which automatically detects the position of the user by using the position sensor 1082, and may be configured to make the user report his/her position by himself/herself using the manual input unit 1085.

The presence information storage unit 1083 comprises a memory which holds the current presence information of the user corresponding to the client terminal 108-i. In this embodiment, presence information comprises the information input from the manual input unit 1085 and the current position of the user which is acquired by the sensor information acquiring unit 1086. The presence information issuing unit 1084 issues presence information stored in the presence information storage unit 1083 to the presence server 104 by a method like wireless communication.

Figure 3:
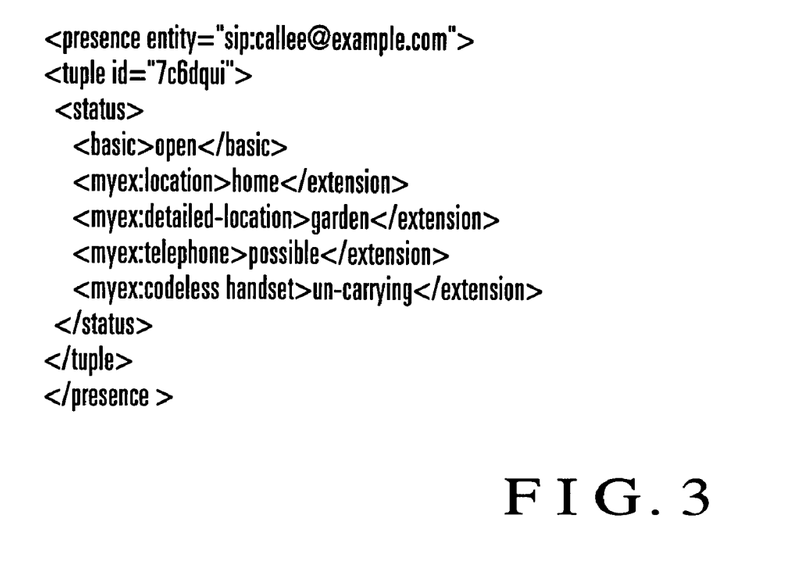
FIG. 3 is a view showing an example of presence information.

FIG. 3 shows an example of presence information. This example is written by CPIM (Common Presence and Instant Messaging) which has been standardized by IETF (Internet Engineering Task Force). Referring to FIG. 3, "sip:callee@example.com" on the first line is a user identifier, "open" on the fourth line indicates that the user is in the online state in which communication can be done, the fifth and sixth lines containing "home" and "garden" indicate that the user is in the garden of the home, and the seventh and eighth lines containing "possible" and "un-carrying" indicate that the user can answer a telephone call but does not have a subsidiary unit. Note that adding a line of "myex" makes it possible to add another arbitrary presence information.

Figure 4A:
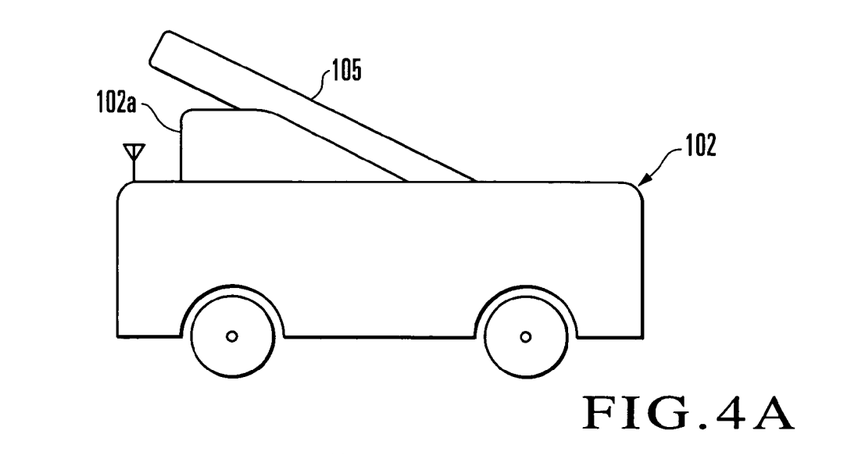
FIGS. 4A to 4C are a side view, a plan view, and a block diagram, respectively, showing the schematic arrangement of a mobile unit in FIG. 1.
Figure 4B:
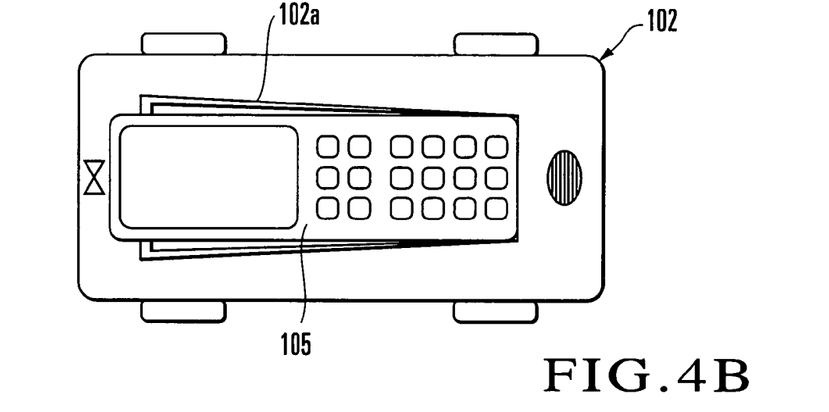
Figure 4C:
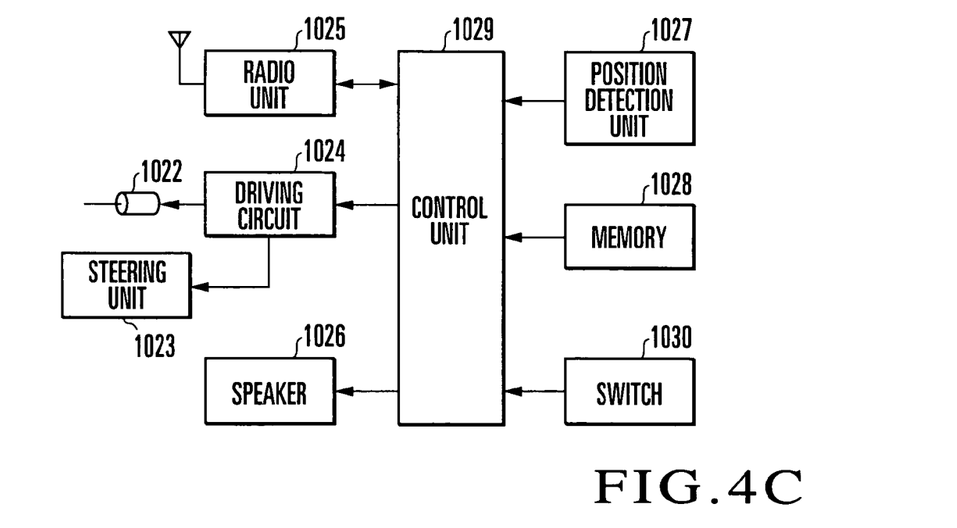

As shown in FIGS. 4A and 4B, the mobile unit 102 which has an outer appearance and size of a four-wheel toy vehicle has a holder 102a which holds a communication device at a slant, and the holder 102a has a recess portion 1021 which houses the communication device 105. As shown in FIG. 4C, the mobile unit 102 incorporates a motor 1022 which drives the wheels, a steering unit 1023 which steers the vehicle, a driving circuit 1024 for them, a radio unit 1025 which communicates with the main apparatus 101 through an antenna, a speaker 1026 which is used to page the user, a position detection unit 1027 such as a GPS device which detects the position of the vehicle, a memory 1028 which stores programs and various kinds of data, a control unit 1029 including a CPU (Central Processing Unit), and a switch 1030. The switch 1030 is provided on the bottom surface of the recess portion 1021. The fixed telephone set 130 is turned on when the communication device 105 is housed in the recess portion 1021, and is turned off when the communication device 105 is removed from the recess portion 1021.

Figure 5:
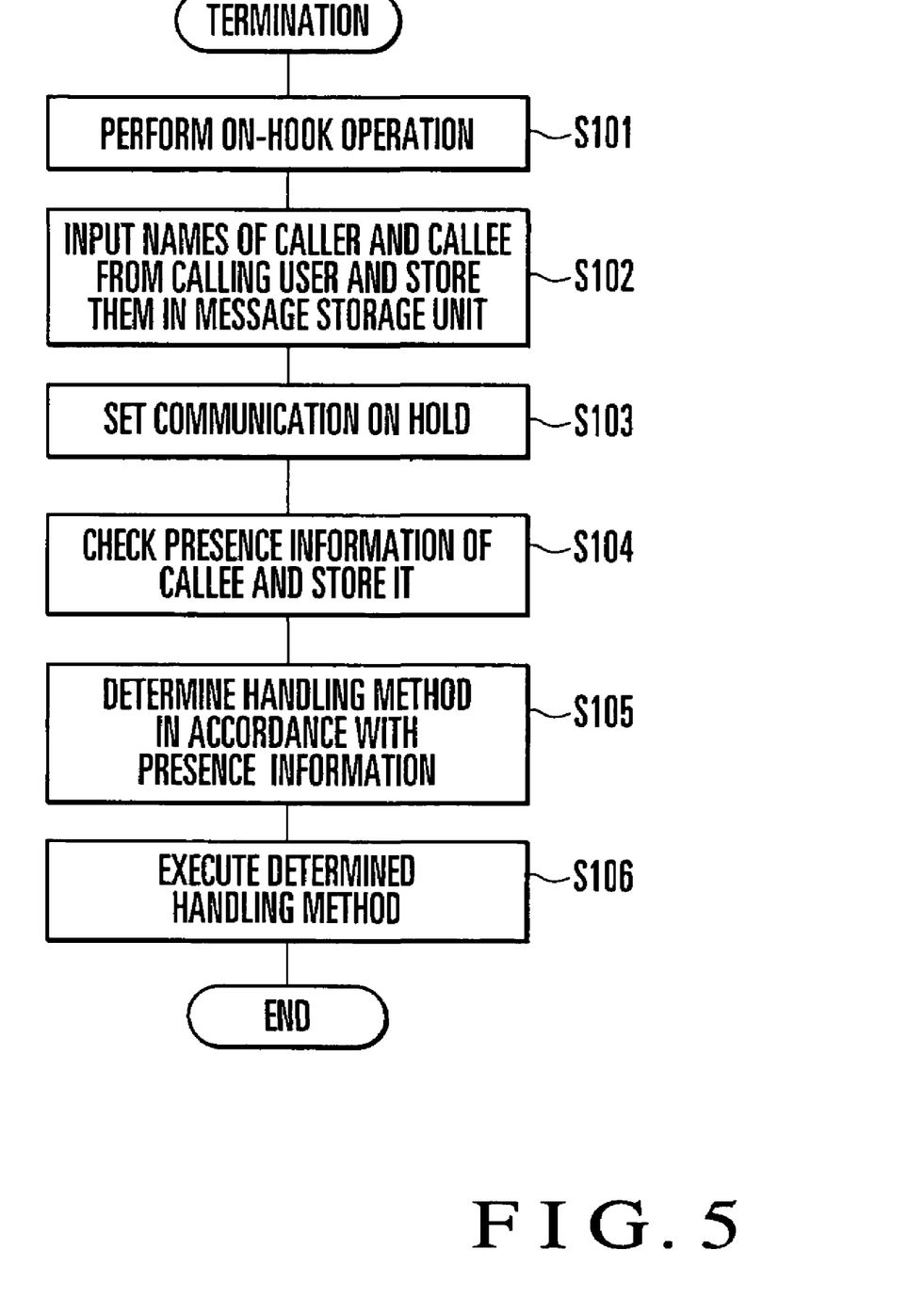
FIG. 5 is a flowchart for explaining processing in the main apparatus in FIG. 1.

The processing by the main apparatus 101 will be described next with reference to FIG. 5. When the communication device 103 receives an incoming call, the main apparatus 101 performs off-hook operation of the communication device 103 by using the automatic answering unit 111 (S101), and answers by voice to the caller by using the voice synthesis function of the automatic answering unit 111. Subsequently, the main apparatus 101 recognizes the voice of the caller by the voice recognition function to detect the name of the caller and the name of the called user as a callee, and stores them in the message storage unit 121 (S102). For example, after the message "This is ∘∘ speaking. Who's calling, please?" is sent to the caller, the utterance "This is xx" from the caller is voice-recognized, and the confirmation message "This is Mr. xx, isn't it?" is sent out by voice synthesis. After the message "whom are you calling?" is sent out by voice synthesis, "ΔΔ, please" from the caller is voice-recognized, and the confirmation message "You are calling ΔΔ, aren't you? Please wait for a second" is sent out by voice synthesis. At this time, the caller name "xx" and called user name "ΔΔ" are stored in the message storage unit 121. Thereafter, the main apparatus 101 temporarily sets the speech communication state of the communication device 103 on hold by using the automatic answering unit 111 (S103).

The presence information inquiring unit 112 then acquires the called user name from the message storage unit 121, and acquires a user identifier corresponding to the called user name by searching a table (not shown) which holds the correspondence between called user names and user identifiers ("sipURL" in the example shown in FIG. 3). The current presence information of the called user is acquired from the presence server 104 and stored in the presence information storage unit 122 (S104). The handling method determination unit 113 reads out the caller name and called user name from the message storage unit 121, and reads out the current presence information of the called user from the presence information storage unit 122, thereby determining a handling method for communication made to the called user on the basis of the readout presence information (S105). The handling method execution unit 114 then receives the determined handling method from the handling method determination unit 113 and executes the determined handling method (S106).

If "ΔΔ" corresponds to a second name, and the presence information inquiring unit 112 discriminates, at the time of table search, that there are a plurality of persons who have the same second name, control is returned to the automatic answering unit 111. With this operation, the automatic answering unit 111 temporarily cancels the held state of the communication device 103, and sends out, for example, the message "Two persons have the name "ΔΔ". Do you know the first name?" by voice synthesis. When, for example, the utterance "ΔΔ□□" is received from the calling user, the calling user name stored in the message storage unit 121 is updated from "ΔΔ" TO "ΔΔ□□" on the basis of the corresponding voice recognition result. Control is then shifted to the presence information inquiring unit 112.

A handling method of delivering the communication device 105 to one of the called users 107-1 to 107-n will be described next. Assume that the current presence information of the called user which is read out from the presence information storage unit 122 is that shown in FIG. 3.

Since the current presence information (FIG. 3) of the called user includes the fourth line containing "open" and the seventh line containing "possible", the handling method determination unit 113 determines that the user wants to answer the telephone call. In addition, since the presence information includes the fifth and sixth lines containing "home" and "garden", the handling method determination unit 113 determines that the user is in the garden of the home. Furthermore, since the presence information includes the eighth line containing "un-carrying", the handling method determination unit 113 determines that the user does not have a subsidiary unit. As a consequence, the handling method determination unit 113 determines a handling method of delivering the communication device 105 to the called user who is in the garden of the home.

The handling method execution unit 114 communicates with the mobile unit 102 by radio to transmit a move command having a called user name (="ΔΔ"), calling user name (=xx), and movement destination (=garden of home) as parameters. Upon receiving this move command through the radio unit 1025, the control unit 1029 of the mobile unit 102 searches for a route from the current position as a departure point to the garden, to which the mobile unit is to move, as an arrival point by using the map information stored in advance in the memory 1028. The control unit 1029 controls the driving operation of the motor 1022 and the steering operation of the steering unit 1023 by controlling the driving circuit 1024 so as to move the mobile unit 102 along the searched-out route.

When the mobile unit 102 approaches the arrival point, the message "Mr. ΔΔ, there is a call from Mr. xx to you." is repeatedly sent out from the speaker 1026. This makes it possible for the called user to recognize that a telephone call is made to him/her. When the called user picks up the communication device 105 mounted on the mobile unit 102 and cancels the held state of communication corresponding to the incoming call by operating the communication device 105, the user can perform speech communication. After the speech communication, the called user returns the communication device 105 to the recess portion 1021 of the mobile unit 102.

The control unit 1029 of the mobile unit 102 detects that the called user has picked up the communication device 105, when the switch 1030 is turned off, and stops moving the mobile unit 102 and sending out the message. When the switch 1030 is turned on again, the control unit 1029 detects that the called user has returned the communication device 105, and notifies the handling method execution unit 114 of the end of the job by radio. At the end of the job, the control unit 1029 searches for a route from the current position as a departure point to a predetermined home position. The control unit 1029 controls the driving operation of the motor 1022 and the steering operation of the steering unit 1023 by controlling the driving circuit 1024 so as to move the mobile unit 102 along the searched-out route. With this operation, the mobile unit 102 returns to the home position.

When the called user receives the communication device 105 and wants to communicate while moving, since the mobile unit 102 is not present in a place where the communication device 105 is returned at the end of speech communication, it takes a lot of trouble to return the communication device 105 to the mobile unit 102. In order to solve this problem, the following processing may be performed.

Upon detecting through the switch 1030 that the called user has picked up the communication device 105, the control unit 1029 of the mobile unit 102 searches for a route from the current position as a departure point to a predetermined home position. The control unit 1029 controls the driving operation of the motor 1022 and the steering operation of the steering unit 1023 by controlling the driving circuit 1024 so as to move the mobile unit 102 along the searched-out route, thereby returning the mobile unit 102 to the original home position. When it is detected from the state of the communication line that the called user has finished speech communication, the handling method execution unit 114 acquires the current position of the called user, communicates with the mobile unit 102 by radio, and transmits a move command containing the called user name and movement destination as parameters.

Upon receiving this move command through the radio unit 1025, the control unit 1029 of the mobile unit 102 searches for a route from the current position as a departure point to the movement destination as an arrival point by using the map information stored in advance in the memory 1028. The control unit 1029 controls the driving operation of the motor 1022 and the steering operation of the steering unit 1023 by controlling the driving circuit 1024 so as to move the mobile unit 102 along the searched-out route. When the mobile unit 102 approaches the arrival point, the message "Mr. ΔΔ, please return the telephone set" is sent out from the speaker 1026. When the called user returns the communication device 105 to the mobile unit 102, the switch 1030 is turned on again. As a consequence, the mobile unit 102 returns to the home position as in the above embodiment.

As another handling method, the mobile unit 102 is provided with a function of detecting and tracking a user who has picked up the communication device 105. This allows the mobile unit 102 to track the called user in the interval between the instant at which the switch 1030 is turned off and the instant at which the switch 1030 is turned on again when the communication device 105 is returned to the mobile unit 102.

According to this embodiment, since the communication device 105 is delivered to a place where a called user is present, on the basis of the presence information of the called user, the called user who does not have the communication device on hand need not go to the place where the communication device is present, and can perform incoming call communication in the place where the user is present. The present invention can also be applied to an agent answering service of making another user answer a phone call. That is, the agent answering service can be done by delivering the communication device 105 to an agent, who will answer the call, through the mobile unit 102 and making the speaker 1026 output a message for urging the agent to answer a phone call, as in the case wherein the communication device 105 is delivered to a called user, instead of paging a user who performs agent answering through an extension phone or the like and informing he/her to answer the phone call as an agent.

Figure 6:
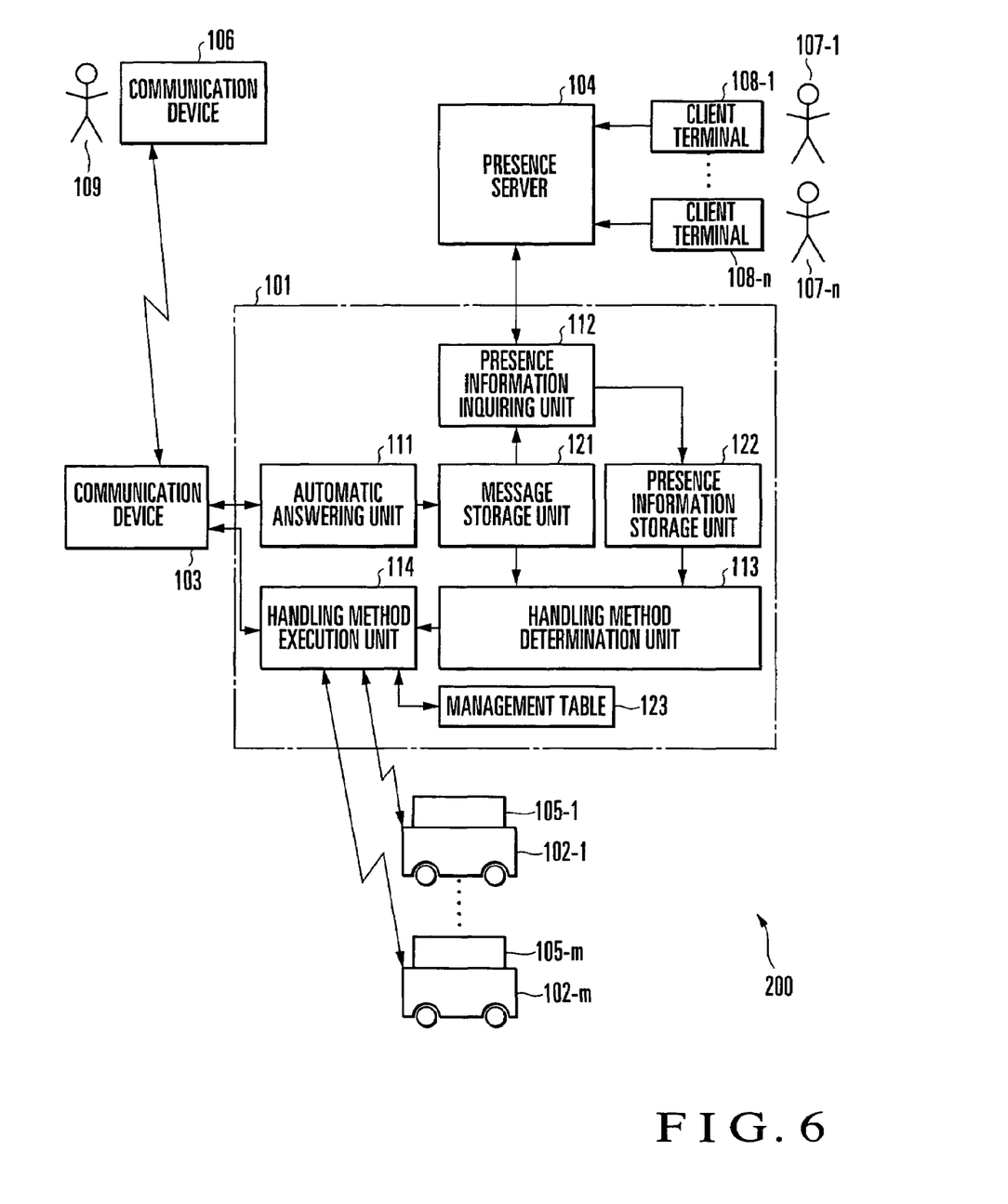
FIG. 6 is a block diagram of a communication agent apparatus according to the second embodiment of the present invention.

A communication agent apparatus according to the second embodiment of the present invention will be described next with reference to FIG. 6. A communication agent apparatus 200 according to this embodiment comprises a plurality of combinations of communication devices 105-1 to 105-m and mobile units 102-1 to 102-m which serve as subsidiary units of a communication device 103. A handling method execution unit 114 of a main apparatus 101 has a management table 123 which manages the operation states of the plurality of mobile units 102-1 to 102-m. Of the plurality of mobile units 102-1 to 102-m, the mobile unit 102-j which is "not in use" in the management table 123 is selected by the handling method execution unit 114. The handling method execution unit 114 issues a move command to the mobile unit 102-j to deliver the communication device 105-j mounted thereon to a called user.

The management table 123 has entries in one-to-one correspondence with the mobile units 102-1 to 102-m. When a command to deliver a communication device to a given called user is issued to a given mobile unit 102-j, the handling method execution unit 114 sets information indicating that the mobile unit is in use in the entry corresponding to the mobile unit. As described above, upon receiving a notification of the end of the job from the mobile unit, the handling method execution unit 114 sets information indicating that the mobile unit is not in use in the entry corresponding to the mobile unit (or deletes the information indicating the mobile unit is in use).

According to this embodiment, since the apparatus comprises a plurality of combinations of communication devices 105-1 to 105-m and mobile units 102-1 to 102-m, even if communication is simultaneously made to a plurality of called users, communication devices can be simultaneously delivered to the respective called users.

Figure 7:
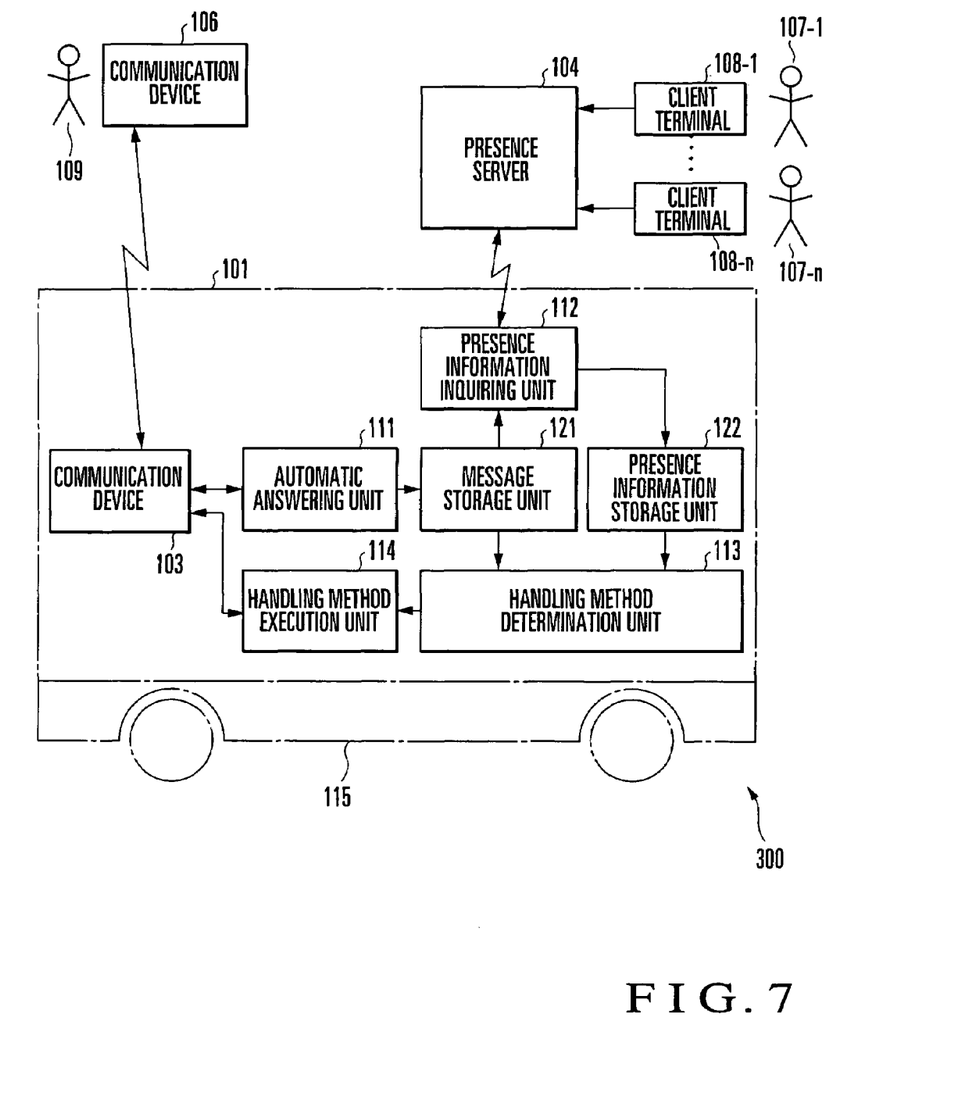
FIG. 7 is a block diagram of a communication agent apparatus according to the third embodiment of the present invention.

A communication agent apparatus according to the third embodiment of the present invention will be described next with reference to FIG. 7. A communication agent apparatus 300 according to this embodiment includes a driving unit 115 for moving a main apparatus 101 itself. In this embodiment, the main apparatus 101 on which a communication device 103 is mounted delivers the communication device 103 to the place where a called user is present. The main apparatus 101 including the driving unit 115 can comprise a moving vehicle which is self-propelled by driving wheels or belt conveyor using a battery or the like as a power source, a robot which can walk with two legs, or the like. In this embodiment, the communication device 103 is preferably a radio unit such as a cellular phone instead of a fixed telephone set, and preferably communicates with a presence server 104 by radio or the like.

According to this embodiment, since the communication device 103 as a base unit itself is delivered to the place where the called user is present, the present invention can be applied to a home where there is no subsidiary unit.

The present invention is not limited to each embodiment described above, and various kinds of additions and changes can be made. For example, the main apparatus 101 may be designed to be movable by itself as in the third embodiment, or may be provided with a mobile unit 102 as in the first or second embodiment. In this case, a communication device is delivered to a called user by preferentially using the mobile unit 102, and can be delivered to the called user by moving the main apparatus 101 only when there is no movable unit which is not in use.

In the first and second embodiments, the main apparatus 101, mobile unit 102, and the like are physically separate from each other from the beginning. However, a portion of the main apparatus 101 may be configured to physically separate from the apparatus to be movable so as to serve as the mobile unit 102.

In each embodiment described above, the presence information of a called user contains position information, and a mobile unit is moved toward the position indicated by the position information. However, a mobile unit may be moved throughout a target area along a predetermined route regardless of the position of a called user.

In addition, the mobile unit 102 may be provided with an indicator panel which displays a paging message containing the name of a callee, and a message may be displayed on the indicator panel instead of or together with a voice paging message.

As has been described above, according to the present invention, a called user who does not have a communication device at hand can be supported. This is because a communication device can be delivered to the called user by using a mobile unit which transports the communication device on the basis of presence information indicating the current situation of the called user.

Furthermore, the communication agent apparatus of the present invention is useful as an apparatus which intermediates communicate on the basis of presence information indicating the current situation of a called user, and is suitably used as a communication agent apparatus in homes, offices, nursing and personal care facilities, and the like, in particular.

What is claimed is:

1. A communication agent system comprising:
at least one mobile unit which transports a communication device;
a presence information inquiring unit which acquires presence information indicating a current situation of a called user;
a handling method determination unit which determines a handling method for communication made from a calling user to the called user on the basis of the acquired presence information; and
a handling method execution unit which executes the determined handling method,
wherein when said handling method determination unit determines a handling method of delivering a communication device used for communication to the called user, said mobile unit delivers the communication device to the called user in accordance with a move command from said handling method execution unit.

2. A system according to claim 1, further comprising:
a message storage unit which stores a message from a calling user; and
an automatic answering unit which automatically answers to communication made from the calling user to the called user, extracts a name of the called user as a callee from voice information from the calling user, and stores the name in said message storage unit,
wherein said presence information inquiring unit acquires current presence information of the called user on the basis of the name of the called user which is stored in said message storage unit.

3. A system according to claim 2, further comprising a presence information storage unit which stores current presence information of a called user which is referred to by said handling method determination unit,
wherein said presence information inquiring unit acquires current presence information of a called user which is input from a client terminal from a presence server to which the client terminal corresponding to the called user is connected, and stores the presence information in said presence information storage unit.

4. A system according to claim 1, wherein said at least one mobile unit comprises a plurality of mobile units which transport a plurality of communication devices, and
wherein said handling method execution unit manages operation states of said plurality of mobile units, and
wherein, when a handling method determined by said handling method determination unit is a handling method of delivering a communication device used for communication to a called user, said handling method execution unit selects a mobile unit which is not in use from said plurality of mobile units and issues a move command.

5. A system according to claim 1, wherein the presence information contains position information of the called user, and
wherein said mobile unit moves to a position indicated by the position information of the called user which is contained in the presence information.

6. A system according to claim 1, wherein said mobile unit comprises a speaker which sends out a paging message containing a name of a called user during movement.

7. A system according to claim 1, wherein said mobile unit comprises:
detection means for detecting that a communication device mounted on said mobile unit is removed and that the communication device is mounted again; and
control means for stopping movement of said mobile unit when said detection means detects that the communication device is removed during transportation, and returning said mobile unit to a home position when said detection means detects that the communication device is mounted again.

8. A system according to claim 7, wherein
when said detection means detects that the communication device is removed, said control means searches for a first route form the current position of said mobile unit to a home position thereof and returns said mobile unit to the home position in accordance with the searched first route, and
when speech communication to the called user is finished, said control means searches for a second route from the home position of said mobile unit to the current position of the called user and moves said mobile unit to the current position of the called user in accordance with the searched second route, when speech communication with the called user is finished.

9. A system according to claim 7, wherein
said mobile unit has a function of detecting and tracking the called user who is picking up the communication device, and
the called user is tracked by said mobile unit in the interval between the instant at which the communication device is removed from said mobile unit and the instant at which the communication device is turned on again.

10. A system according to claim 1, wherein
the presence information contains position information of the called user, and
said mobile unit moves throughout a target area along a predetermined route regardless of the position of the called user.

11. A system according to claim 1, wherein
said mobile unit comprises an indicator panel which displays a paging message containing a name of the called user during movement.

* * * * *